United States Patent
Bai et al.

(10) Patent No.: US 8,942,183 B2
(45) Date of Patent: Jan. 27, 2015

(54) METHOD FOR ASSIGNING THE CARRIER FREQUENCY IN A TRUNKED SYSTEM

(75) Inventors: Wei Bai, Shenzhen (CN); Rui Tao, Shenzhen (CN); Zhihui Zhang, Shenzhen (CN); Chi Huang, Shenzhen (CN); Feng Jiang, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 1225 days.

(21) Appl. No.: 12/280,217

(22) PCT Filed: Mar. 3, 2006

(86) PCT No.: PCT/CN2006/000318
§ 371 (c)(1),
(2), (4) Date: Aug. 21, 2008

(87) PCT Pub. No.: WO2007/098640
PCT Pub. Date: Sep. 7, 2007

(65) Prior Publication Data
US 2009/0239515 A1    Sep. 24, 2009

(51) Int. Cl.
*H04Q 7/00*    (2006.01)
*H04W 72/00*    (2009.01)
*H04W 72/04*    (2009.01)
*H04W 84/08*    (2009.01)

(52) U.S. Cl.
CPC ........ H04W 72/005 (2013.01); *H04W 72/0453* (2013.01); *H04W 84/08* (2013.01)
USPC ........................................................ 370/329

(58) Field of Classification Search
None
See application file for complete search history.

(56) References Cited

U.S. PATENT DOCUMENTS

| | | | | |
|---|---|---|---|---|
| 3,806,804 A * | 4/1974 | Mills et al. | ..... | 455/509 |
| 5,179,588 A * | 1/1993 | Nowicki | ..... | 379/170 |
| 5,299,198 A * | 3/1994 | Kay et al. | ..... | 370/347 |
| 5,381,403 A * | 1/1995 | Maher et al. | ..... | 370/254 |
| 5,448,758 A * | 9/1995 | Grube et al. | ..... | 455/503 |
| 5,450,405 A * | 9/1995 | Maher et al. | ..... | 370/261 |
| 5,493,695 A * | 2/1996 | Aitkenhead et al. | ..... | 455/509 |
| 6,041,222 A * | 3/2000 | Horton et al. | ..... | 455/255 |
| 6,058,306 A * | 5/2000 | Liu | ..... | 455/427 |
| 6,178,175 B1 * | 1/2001 | Zumkeller | ..... | 370/436 |
| 6,366,782 B1 * | 4/2002 | Fumarolo et al. | ..... | 455/457 |
| 6,408,179 B1 * | 6/2002 | Stosz et al. | ..... | 455/428 |

(Continued)

FOREIGN PATENT DOCUMENTS

CN    1549484 A    11/2004
CN    1567790 A    1/2005

OTHER PUBLICATIONS

International Search Report for PCT/CN2006/000318 dated Dec. 2, 2006 (Mailed Dec. 28, 2006),2 pgs.

(Continued)

*Primary Examiner* — Hassan Phillips
*Assistant Examiner* — Prenell Jones
(74) *Attorney, Agent, or Firm* — Banner & Witcoff, Ltd.

(57) ABSTRACT

The present invention discloses a method for assigning the carrier frequency in a trunking system, which includes: after the base station subsystem receiving a group call request, it assigns a carrier frequency reference for this group call, by which to establish the forward channels of the group users managed by the base station subsystem. With the method offered by the present invention, all the group members under a base station subsystem could be established on the same carrier frequency reference as far as possible, thereby sharing of the wireless channels.

14 Claims, 4 Drawing Sheets

(56) References Cited

U.S. PATENT DOCUMENTS

| | | | |
|---|---|---|---|
| 6,449,491 B1* | 9/2002 | Dailey | 455/518 |
| 6,483,817 B1* | 11/2002 | Antonio et al. | 370/328 |
| 6,496,531 B1* | 12/2002 | Kamel et al. | 375/130 |
| 6,661,941 B1* | 12/2003 | Yao | 385/15 |
| 6,763,015 B1* | 7/2004 | Phillips et al. | 370/347 |
| 7,099,629 B1* | 8/2006 | Bender | 455/69 |
| 7,183,971 B1* | 2/2007 | Lloyd et al. | 342/357.22 |
| 7,409,028 B2* | 8/2008 | Ham, III | 375/376 |
| 7,471,639 B1* | 12/2008 | Bauer et al. | 370/252 |
| 7,697,560 B2* | 4/2010 | Yamauchi et al. | 370/444 |
| 7,760,109 B2* | 7/2010 | Broad et al. | 340/539.23 |
| 7,970,425 B2* | 6/2011 | Balachandran et al. | 455/519 |
| 2002/0039900 A1* | 4/2002 | Wiedeman et al. | 455/428 |
| 2002/0064142 A1* | 5/2002 | Antonio et al. | 370/335 |
| 2002/0147978 A1* | 10/2002 | Dolgonos et al. | 725/62 |
| 2003/0076802 A1* | 4/2003 | Cooley et al. | 370/336 |
| 2003/0103445 A1* | 6/2003 | Steer et al. | 370/208 |
| 2003/0154249 A1* | 8/2003 | Crockett et al. | 709/204 |
| 2004/0042438 A1* | 3/2004 | Jiang et al. | 370/342 |
| 2004/0057449 A1* | 3/2004 | Black | 370/432 |
| 2004/0114618 A1* | 6/2004 | Tong et al. | 370/431 |
| 2005/0025182 A1* | 2/2005 | Nazari | 370/469 |
| 2006/0003699 A1* | 1/2006 | Gibson et al. | 455/12.1 |
| 2006/0003784 A1* | 1/2006 | Chion et al. | 455/518 |
| 2006/0013182 A1* | 1/2006 | Balasubramanian et al. | 370/343 |
| 2006/0056361 A1* | 3/2006 | Jiang et al. | 370/335 |
| 2006/0274711 A1* | 12/2006 | Nelson et al. | 370/342 |
| 2007/0049314 A1* | 3/2007 | Balachandran et al. | 455/518 |
| 2007/0171808 A1* | 7/2007 | Wu et al. | 370/208 |
| 2008/0212519 A1* | 9/2008 | Fang et al. | 370/320 |
| 2009/0092116 A1* | 4/2009 | Jiang et al. | 370/340 |
| 2013/0070784 A1* | 3/2013 | Denney et al. | 370/462 |

OTHER PUBLICATIONS

Office Action issued in corresponding Chinese Application, Application No. 200680050264.1, on Dec. 31, 2010 (with an English translation thereof).

* cited by examiner though the Slave MP assigns a temporary carrier frequency reference, but the Master MP determines a carrier frequency reference which is different from the temporary carrier frequency reference.

METHOD FOR ASSIGNING THE CARRIER FREQUENCY IN A TRUNKED SYSTEM

RELATED APPLICATION DATA

This application is a national stage application of co-pending PCT Application No. PCT/CN2006/000318 filed Mar. 3, 2006, which application is entirely incorporated herein by reference.

FIELD OF THE INVENTION

The present invention relates to the field of trunking communication, especially to a method for assigning carrier frequency in a trunking system.

BACKGROUND OF THE INVENTION

The development of mobile communications technique not only meets people's needs for voice service but also more and more effectively satisfies the needs for value-added services including the interaction of imaging, audio and real-time multimedia services, consequently the mobile communications system gradually plays a significant role in people's life and work. Among the above, the trunking communication has increasingly become an indispensable service, and the digital trunking system is an important branch of the mobile communication system. The digital trunking system refers to a specific mobile communication system in which several users share a group of wireless channels and dynamically use these channels. It is a command and dispatch system which is urgently needed in the departments having high requirement for command and dispatch functions, such as enterprises, undertakings, industry and mining, oil field, farm, public security, military and police in the countries having relatively developed society and economy, industry and agriculture.

The main characteristic of the trunking service is group call, i.e. after a user inputs the group numbers at the terminal, only by pressing PTT (Push To Talk) key he/she can initiate a group call to communicate with all the group members.

To a terminal of any user, the data transmitted through the forward channels is independently encoded and modulated, but for a group call, the data sent to all members of the group is the same. If the mechanism of sharing the wireless channel is introduced, the data shall be superposed before sent through the forward channels, which means that they can be actually seen as one signal. By doing so, the forward channels of these group members can be considered as being combined into one forward channel for sending. The advantage of the above is that the forward transmission power resource is effectively saved and the system capacity is improved.

However, in the techniques now provided, it can not be guaranteed that the forward channels of all group members under the BSS (Base Station Subsystem) are established at one carrier frequency, therefore the sharing of channel can not be achieved.

SUMMARY OF THE INVENTION

The present invention aims at providing a method for assigning carrier frequency in a trunking system, by which the wireless channels are shared as far as possible and the forward transmission power is saved.

In order to solve the above technical problem, the present invention provides a method for assigning carrier frequency in a trunking system, which includes: the base station subsystem receiving a group call request, then assigning a carrier frequency reference to this group call and establishing the forward channels of the group users managed by the base station system at the carrier frequency reference.

Furthermore, the above method may have the following feature: the group call request received by the base station system is a group access request by the user, including the request of originating a call by the user or the response sent by the user to the paging request sent by dispatch server.

Furthermore, the above method may have the following feature: the carrier frequency reference assigned for the group is statically configured in the dispatch server system as an attribute of the group.

Furthermore, the above method may have the following feature: the group call is centrally processed by a main processor MP, the carrier frequency reference of the group is dynamically assigned by the MP according to predetermined rules and deleted after the call ends.

Furthermore, the above method may have the following feature: after the MP has assigned the carrier frequency reference, if the number of the users of this group at a carrier frequency F1 exceeds the number of users at the original carrier frequency reference by a predetermined threshold, the MP updates the carrier frequency reference of the group call to the carrier frequency F1.

Furthermore, the above method may have the following feature: the group call is processed by several processors MPs, the base station system assigns a Master MP for the group, and the other MPs are Slave MPs; after the base station system receives the group call request, the following steps are performed:

(a) the base station system selecting a MP and sending the request to the MP, if the MP being the Master MP, step (b) being performed, if the MP being the Slave MP, step (c) being performed;

(b) after the Master MP having received the request, it determining if the carrier frequency reference of the group call exists or not, if yes, ending; otherwise, assigning a carrier frequency reference for the group call and announcing the carrier frequency reference to all the Slave MPs, then the Slave MPs determining or updating their local carrier frequency reference after receiving the carrier frequency reference, and ending;

(c) after the Slave MP having received the request, it determining if the carrier frequency reference of the group call exists or not, if yes, ending; otherwise, notifying the Master MP, then the Maser MP determining the carrier frequency reference of the group call and announcing it to all the Slave MPs through a message, the Slave MPs determining or updating their local carrier frequency reference according to the carrier frequency reference in the message, and ending.

Furthermore, the above method may have the following feature: after the Slave MP has received the request in said step (c), it firstly assigns a temporary carrier frequency reference for the call and sends a carrier frequency reference registration request which carries the temporary carrier frequency reference to the Master MP; after the Master MP has received the registration request, it checks whether the carrier frequency reference of the group call exists or not, if yes, it announces the carrier frequency reference to all MPs, otherwise, it takes the temporary carrier frequency reference as the carrier frequency reference of the group call, and returns a registration response to the Slave MP and sends a carrier frequency reference synchronization message to other Slave MPs.

Furthermore, the above method may have the following feature: the Master MP and the Slave MP assign the carrier frequency reference or the temporal carrier frequency reference based on the condition that the load is lightest and/or the resource is most sufficient; or based on the condition that the load is smaller than the threshold predetermined by the system.

Furthermore, the above method may have the following feature: it also includes the following process of deleting the carrier frequency reference:

(i) after the Slave MP having received a release message from the user, if it determining that the user is the last user in the group call processed by the MP, it sending a carrier frequency reference delete request to the Master MP;

(j) after the Master MP having received the carrier frequency reference delete request from the Slave MP, it first checking at local if there is still user in the call, if no, checking other Slave MPs and determining whether the user is the last user in the call managed by the BSS, if yes, the next step being performed, otherwise, ending;

(k) the Master MP deleting the carrier frequency reference of the group call and sending the carrier frequency reference delete command to all the Slave MPs, and the Slave MPs deleting the carrier frequency reference of the group call after receiving the message.

Furthermore, the above method may have the following feature: it also includes the following process of deleting the carrier frequency reference:

(o) after the Master MP having received the release message from the user, it first checking at local to determine whether the user is the last user in the group call managed by the local, if yes, the next step being performed, otherwise, ending;

(p) the Master MP checking each of the Slave MPs in the group to determine whether the user is the last user in the group call managed by the BSS, if yes, the next step being performed, otherwise, ending;

(q) the Master MP deleting the carrier frequency reference of the group call and sending the carrier frequency reference delete command to all the Slave MPs, and the Slave MPs deleting the carrier frequency reference of the group call after receiving the message.

Furthermore, the above method may also have the following feature: whenever there is user handoffing or releasing, the Master MP obtains the using condition of the carrier frequency from all the users in the group call, if the number of users at a carrier frequency F1 exceeds the number of users at the carrier frequency reference by a predetermined threshold, the carrier frequency reference is updated to the carrier frequency F1.

Furthermore, the above method may also have the following feature: the process of updating the carrier frequency reference includes the following steps of:

(A) after the user handoffing and releasing processed by the Slave MP, the Slave MP checking the number of the group users on the carrier frequency F1 locally, if the number of users at one carrier frequency F1 exceeds the number of the users at the original carrier frequency reference by a predetermined threshold, the next step being performed, otherwise, no further process being performed and ending;

(B) the Slave MP sending a carrier frequency reference update request with the information of the carrier frequency F1 to the Master MP, after receiving the request the Master MP checking at the local and other Slave MPs to obtain the using condition of carrier frequency by all the group users managed by the BSS, if the number of users at the carrier frequency F1 exceeds the number of the users at the carrier frequency reference by a predetermined threshold, the next step being performed, otherwise, no further process being performed and ending;

(C) the Master MP updating its carrier frequency reference and sending the carrier frequency reference update command with the information of carrier frequency F1 to all of the Slave MPs, the Slave MPs updating the carrier frequency reference locally after receiving the update message.

Furthermore, the above method may also have the following feature: the process of updating the carrier frequency reference includes the following steps of:

(I) after the user switching and releasing processed by the Master MP, the Master MP checking the using condition of the group users locally, if the number of users at one carrier frequency F1 exceeds the number of users at the carrier frequency reference by a predetermined threshold, the next step being performed, otherwise, no further process being performed and ending;

(J) the Master MP checking each Slave MP to acquire the using condition of the carrier frequency by all the group users managed by the BSS, if the number of users at the carrier frequency F1 exceeds the number of users at the carrier frequency reference by the predetermined threshold, the next step being performed, otherwise, no further process being performed and ending;

(K) the Master MP updating its carrier frequency reference and sending the carrier frequency reference update command with the information of the carrier frequency F1 to all the Slave MPs, the Slave MPs updating the information of the carrier frequency reference on the local MP after receiving the update message.

From the above description, it can be seen that the method of the present invention is able to establish all the group members under a BSS at one carrier frequency, so as to lay basis for further realizing the mechanism of sharing the wireless channels.

PREFERRED EMBODIMENT OF THE INVENTION

In the following, the technical scheme of the present invention will be described in further detail by taking the CDMA trunking communication system as an example by combining the accompanying drawings and embodiments.

In order to realize the sharing of the wireless channels, the most fundamental principle is to establish the forward channels of all group members under a BSS (Base Station Subsystem) on one carrier frequency as far as possible. This carrier frequency is called the carrier frequency reference.

There are two ways of determining and implementing the carrier frequency reference, i.e. static configuration and dynamic assignment.

The implementation of static configuration is relatively simple, in which the carrier frequency reference used by a group is determined when assigning the group. For example, the carrier frequency used by the group is determined and assigned as an attribute of the group. Whenever a call is to be established, the attribute can be used to fixedly assign the carrier frequency for the group members.

When the method of dynamically assigning the carrier frequency reference is applied, the carrier frequency reference is maintained by the BSS dynamically. The BSS assigns and maintains a carrier frequency reference for each group call established under the BSS. For a group call, the BSS will maintain the carrier frequency reference for this group as long as there is a group member under the BSS in the call, and the carrier frequency of the group members accessed in the BSS will be assigned to the carrier frequency reference as far as possible. Otherwise, the carrier frequency reference of the group will be released.

The method for dynamically assigning the carrier frequency reference has two processing ways, i.e. distributed process and centralized process, which will be described in the following two embodiments respectively.

The First Embodiment

FIG. 1~FIG. 4 illustrate the environment of CDMA trunking communication applying the method of dynamically assigning carrier frequency reference in the present invention. The update of user information mainly involves entities in the trunking system like MS (Mobile Station), BSS, wherein, the BSS applies the distributed processing method. In the distributed processing method, the calls of users in the same group are distributed on each different Main Processor (MP) to process; to maintain consistency of the carrier frequencies of all group users, a Master MP must be designated. The Master MP and the Slave MPs of one group can be determined as soon as the BSS power on. The Master MP has the detail information of the Slave MPs'. The Master MP works normally in normal states, such as no fault. In the embodiment of the present invention, the MP powered up firstly is taken as the Master MP; when the condition of the Master MP becomes abnormal (fault), a Slave MP is arbitrarily designated as the Master MP.

Figure 3:
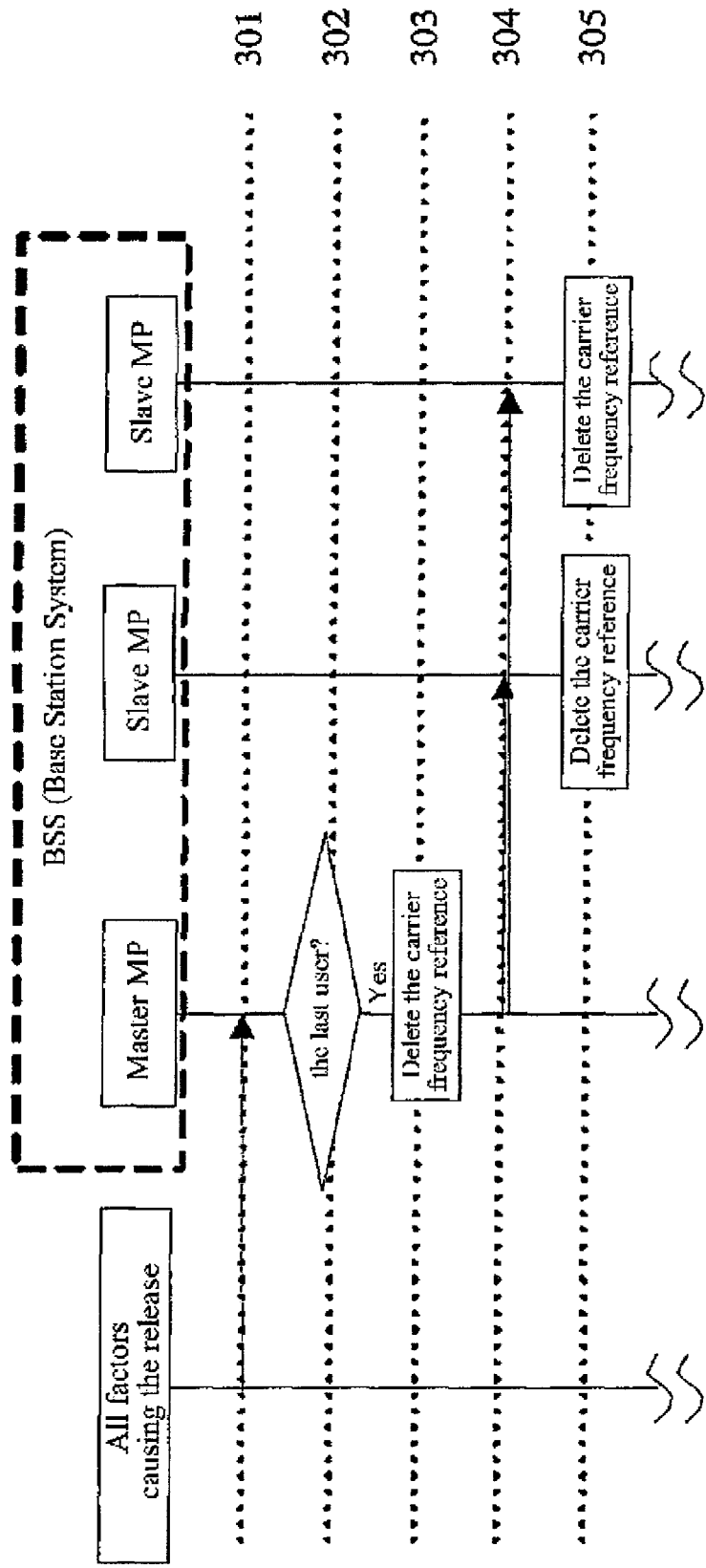
FIG. 3 is a schematic view of deleting the carrier frequency reference when the user managed by the Master MP releasing during dynamical assignment of the carrier frequency reference in accordance with an embodiment of the present invention.
Figure 4:
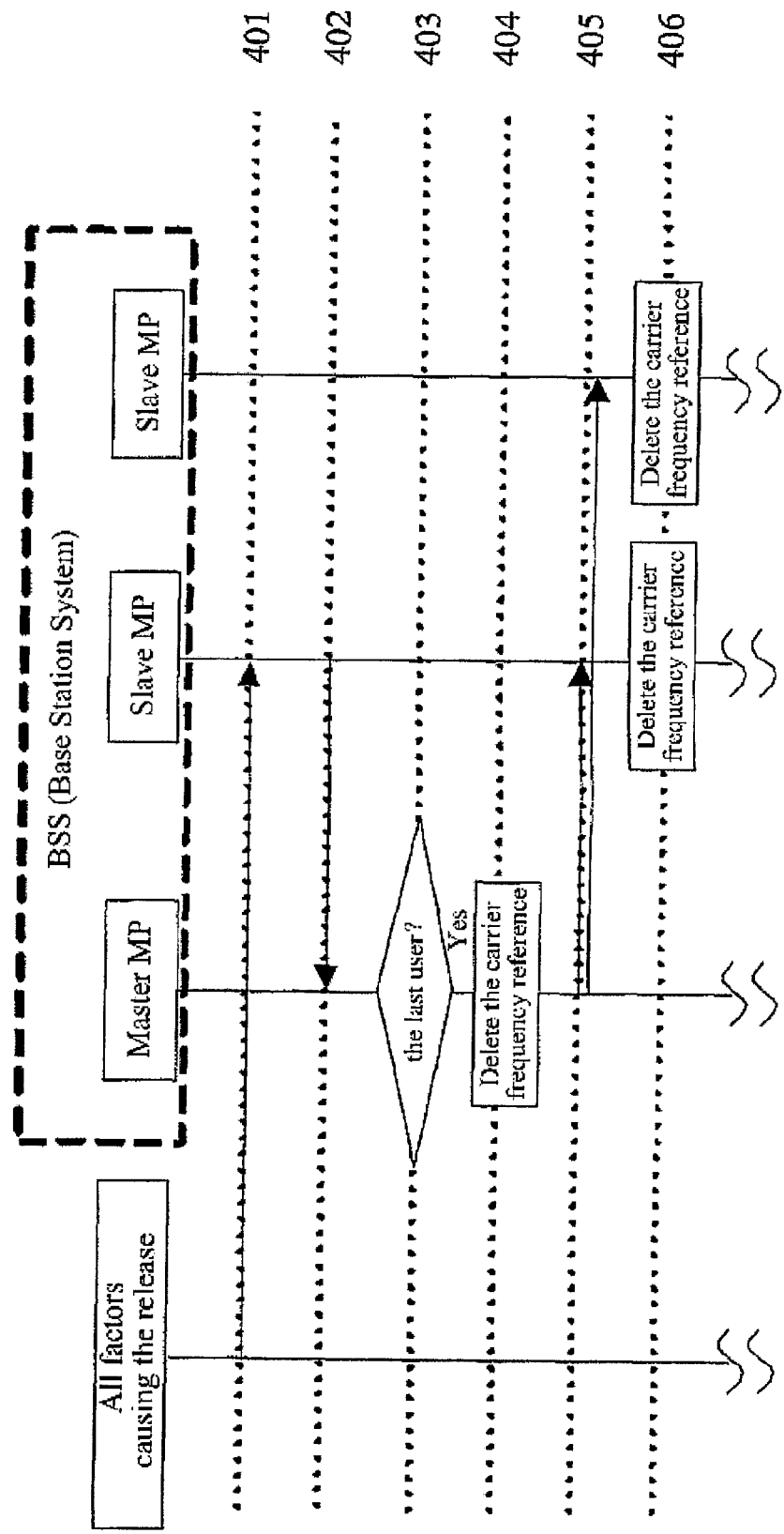
FIG. 4 is a schematic view of deleting the carrier frequency reference when the user managed by the Slave MP releasing during dynamical assignment of the carrier frequency reference in accordance with an embodiment of the present invention.

"Various factors causing the release" mentioned in FIG. 3 and FIG. 4 means the entities that may cause the BSS to release a group call of a certain user.

Figure 1:
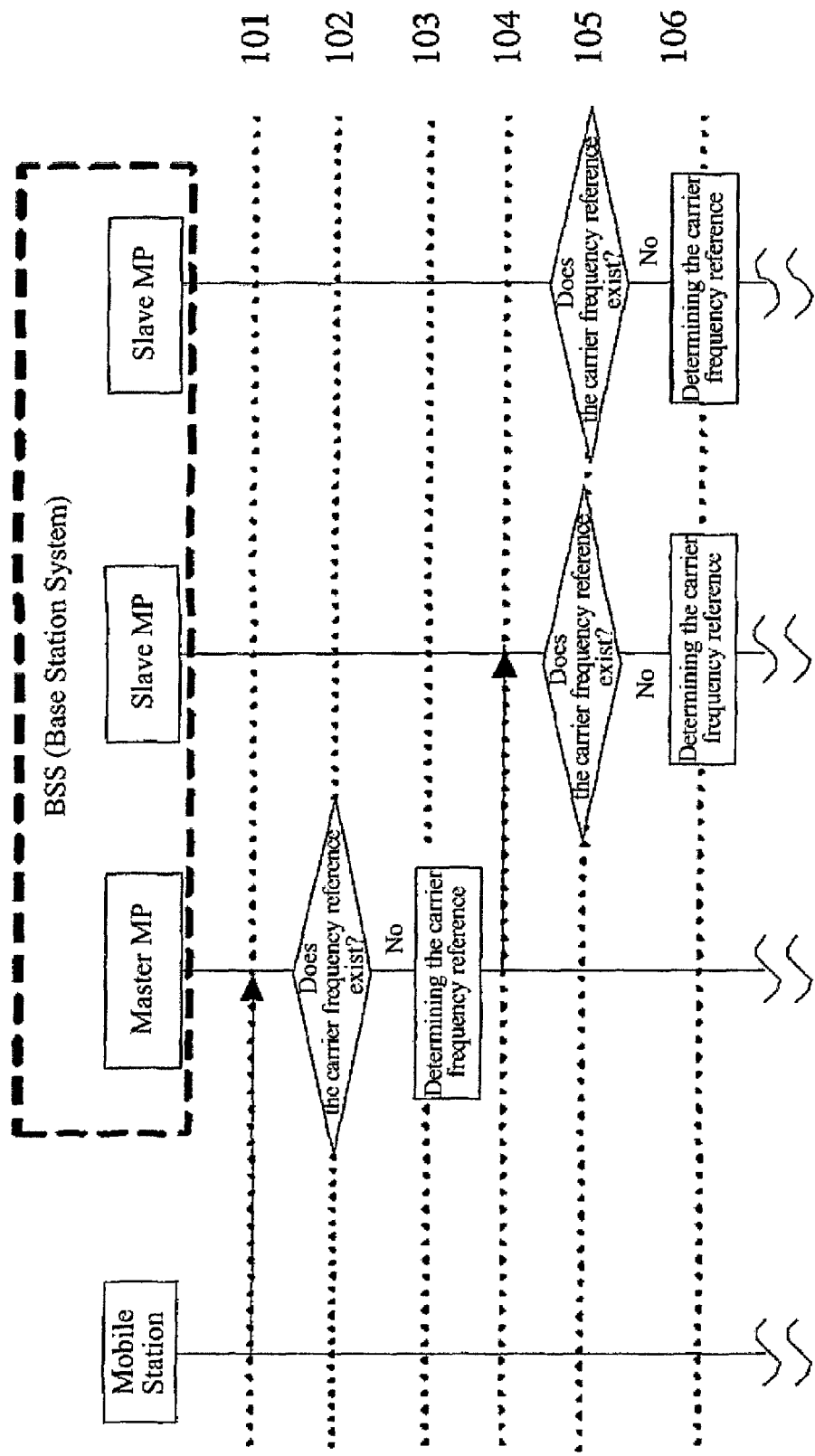
FIG. 1 is a schematic view of the Master MP determining and synchronizing the carrier frequency reference during dynamical assignment of carrier frequency reference in accordance with an embodiment of the present invention.

FIG. 1 shows the process of determining and synchronizing the carrier frequency reference by the Master MP after it have received a group call request from the user during dynamical assignment of the carrier frequency reference according to the present embodiment, which includes the following steps of:

Step 101, the BSS receiving a group call access request from the user (the request for originating a group call by the user or the response from the user after he/she has received a paging from the dispatch server), sending the message to the corresponding MP for processing through the algorithm selected by the MP, here it is assumed that the message is sent to the Master MP;

The above algorithm selected by the MP may be that some users are assigned to the Master MP and some others to the Slave MPs according to the user's IMSI (International Mobile Subscriber Identifier), such as the residual of modulo a certain number or the modulus.

Step 102, after the Master MP having received the call request from the user, it determining if there exists a carrier frequency reference in the local MP corresponding to the group call or not, if yes, ending directly; otherwise, proceeding to step 103;

After the carrier frequency reference is determined and the MS is accessed, there may occur such condition that the MS is dropped and re-accessed, at the time, the MP already has the carrier frequency reference corresponding to the group call.

Step 103, the Master MP determining the carrier frequency reference corresponding to the group call;

In the present invention, both the Master MP and the Slave MPs can assign a carrier frequency reference according to the predetermined strategy, such as that the load is lightest or the resource is most sufficient, which is not limited in the present invention;

Step 104, the Master MP sending a carrier frequency reference synchronization message to all the Slave MPs and announcing the determined carrier frequency reference to all the Slave MPs in the group;

Step 105, after each Slave MP having received the carrier frequency reference synchronization message, it determining if there exists a temporal carrier frequency reference in the local MP corresponding to the group call, if yes, updating its carrier frequency reference according to the carrier frequency reference determined by the Master MP in the message, and ending; otherwise, proceeding to step 106;

In the present embodiment, it needs to determine whether there exists the temporal carrier frequency reference corresponding to the group call in each of the Slave MPs, because in the specific implementation of the present invention, the Slave MPs firstly process the group call request sent by the user, but there is a possible abnormal condition that the registration request sent to the Master MP is lost, under such condition, the Slave MP already has the temporal carrier frequency reference corresponding to the group call.

Step 106, the Slave MP setting the carrier frequency reference in the received synchronization message as the carrier frequency reference corresponding to the group call.

Figure 2:
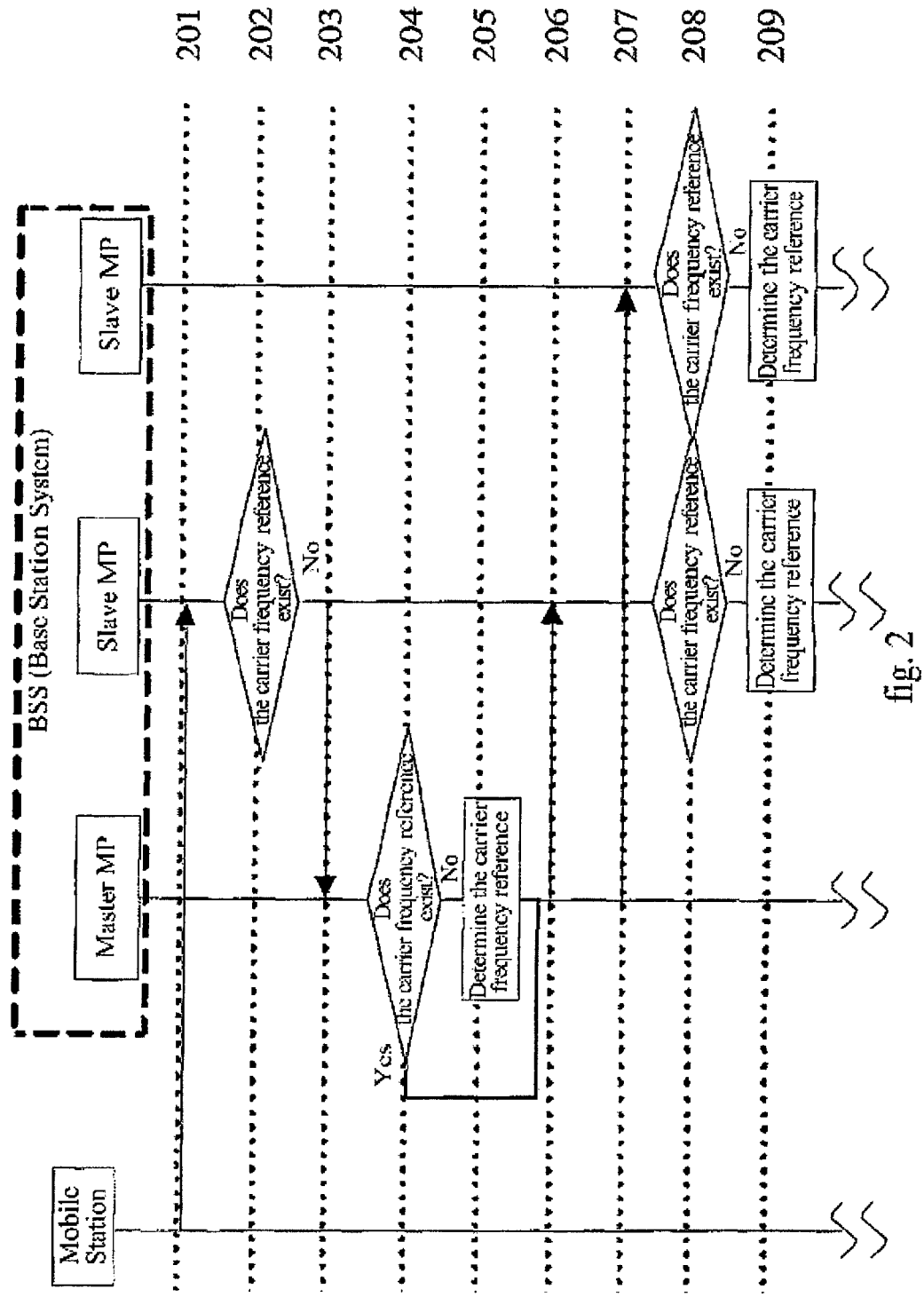
FIG. 2 is a schematic view of the Slave MP determining and synchronizing the carrier frequency reference during dynamical assignment of carrier frequency reference in accordance with an embodiment of the present invention.

FIG. 2 illustrates the process of determining and synchronizing the carrier frequency reference by the Slave MP after it has received the group call request from a user during dynamical assignment of the carrier frequency reference according to an embodiment of the present invention, which includes the following steps of:

Step 201, BSS receiving the group call access request from the user (the request of originating a group call by the user or the response from the user after he/she has received the paging from the dispatch server), sending the message to the MP for processing through the algorithm selected by the MP, here it is assumed that the message is sent to the Slave MP;

Step 202, after the Slave MP having received the call request from the user, it determining if there exists a carrier frequency reference corresponding to the group call in the local MP, if yes, ending directly; otherwise, assigning a temporal carrier frequency reference for the group call, and proceeding to step 203 after succeeding;

Step 203, the Slave MP sending the carrier frequency reference registration request which carries the information of the temporal carrier frequency reference to the Master MP;

Step 204, after the Master MP having received the carrier frequency reference registration request from the Slave MP, it determining if there exists a carrier frequency reference corresponding to the group call in the Master MP or not, if yes, proceeding to step 26, otherwise, proceeding to step 205;

There is a possibility that the carrier frequency reference synchronization message sent from the Master MP to the Slave MP is lost, under such abnormal condition, the Master MP already has the carrier frequency reference while the Slave MP has not.

Step 205, the Master MP taking the temporal carrier frequency reference in the registration request as the carrier frequency reference corresponding to the group call;

Step 206, the Master MP sending a response message for the carrier frequency reference registration which carries the information of carrier frequency reference decided by the Master MP to the Slave MP who asks for registration;

Step 207, the Master MP sending the carrier frequency reference synchronization message which carries the information of the carrier frequency reference decided by the Master MP to the other Slave MPs;

Step 208, after each Slave MP having received the response message for the carrier frequency reference registration or the carrier frequency reference synchronization message, if the MP already has the carrier frequency reference corresponding to the group call, it updating the carrier frequency reference with the carrier frequency reference in the above message, ending; otherwise, proceeding to step 209;

Step 209, the Slave MP saving the carrier frequency reference in the carrier frequency reference synchronization message to take it as the carrier frequency reference of the MP corresponding to the group call.

When there are several users in one group originate the group call request simultaneously or the BSS receives several paging requests simultaneously, the BSS may send several requests to different MPs, such as the Master MP and the Slave MP, for processing according to the algorithm selected by the MP. For the system, the carrier frequency is not decided yet, hence the two processes shown in FIG. 1 and FIG. 2 respectively may exist at the same time.

According to the above two processes, after each MP has decided the carrier frequency reference of the group call, the forward channels assigned for the group members should be assigned to the carrier frequency reference as far as possible, by doing so, the mechanism of sharing wireless channel is further realized.

After the group call is released, each MP should delete the saved carrier frequency reference of the group call. FIG. 3 shows the process of deleting the carrier frequency reference when the user managed by the Master MP needs releasing during dynamical assignment of the carrier frequency reference according to an embodiment of the present invention, which includes the following steps of:

Step 301, a certain user managed by the Master MP needing releasing, sending a release message to the Master MP through a terminal;

Step 302, after the Master MP having received the release message, it firstly checking at the local to determine whether the user is the last user of the call managed by the local, if yes, checking in each Slave MP, otherwise, ending; after checking in each Slave MP, the Master MP further determining if the user is the last user of the call managed by the BSS, if yes, proceeding to step 303; otherwise, no deletion being performed and ending;

Step 303, the Master MP deleting the carrier frequency reference corresponding to the group call;

Step 304, the Master MP sending the carrier frequency reference deletion message to all the Slave MPs;

Step 305, after the Slave MPs having received the carrier frequency reference deletion message, they deleting the carrier frequency reference corresponding to the group call.

FIG. 4 shows the process of deleting the carrier frequency reference when the user managed by the Slave MP needs deleting during dynamical assignment of the carrier frequency reference according to an embodiment of the present invention, which includes the following steps of:

Step 401, the user managed by the Slave MP needing releasing, sending the release message to the Slave MP through a terminal;

Step 402, after the Slave MP having received the release message, it checking if the terminal is the last user of the group call processed by the MP, if yes, sending the carrier frequency reference deletion request message to the Master MP, otherwise, on further process being performed and ending;

Step 403, after the Master MP having received the carrier frequency reference deletion request, it firstly checking at the local to see if there is still user in the call, if no, checking in other Slave MPs to further determine whether the user is the last user of the call managed by the BSS; if yes, proceeding to step 404, otherwise, ending directly;

Step 404, the Master MP deleting the carrier frequency reference corresponding to the group call;

Step 405, the Master MP sending the carrier frequency reference deletion message to all the Slave MPs;

Step 406, after the Slave MPs having received the carrier frequency reference deletion message, deleting the carrier frequency reference corresponding to the group call.

In another embodiment of the present invention, when the user managed by the Slave MP needs releasing, the release message is sent to the Slave MP through the terminal; after the Slave MP has received the release message, it checks if the terminal is the last user of the group call, if yes, notifies the Master MP, the Master MP deletes the carrier frequency reference corresponding to the group call after receiving the notification and notifies all the Slave MPs, the Slave MPs delete the carrier frequency reference corresponding to the group call after receiving the notification.

However, when the Slave MP checks whether the terminal is the last terminal participating in the call in the group, the interactions between the slave MPs are relatively complicated and the control points are relatively dispersive.

After the user is accessed, the carrier frequency of the forward channel may be changed due to the processes of switch, release etc. In this embodiment, in order to make sure that the forward channels of the group members are established at one carrier frequency, the determined carrier frequency can be updated following the user's operations of switch and release etc. The updating process of carrier frequency reference includes the following steps of:

Step A, after the user switching and releasing processed by the Slave MP, the MP checking the assignment condition of the carrier frequency of the group user on the local MP, if the number of users at one carrier frequency F1 exceeds the number of users at the original carrier frequency reference by a certain threshold, proceeding to step B; otherwise, no further process being performed and ending;

Step B, the Slave MP sending the carrier frequency reference update request which carries the information of the carrier frequency F1 to the Master MP;

Step C, after the Master MP having received the message, it checking at local and other Slave MPs to determine the using condition of the carrier frequency by all group users managed by the BSS, if the number of users at the carrier frequency F1 exceeds the number of users at the carrier frequency reference by a threshold, proceeding to step D, otherwise, no further process being performed and ending;

Step D, the Master MP updating its carrier frequency reference and sending the carrier frequency reference update message which carries the information of the carrier frequency F1 to all the Slave MPs, and after the Slave MP has received the update message, it updating the information of the carrier frequency reference on the local MP.

The updating of the carrier frequency reference can also be initiated by the Master MP, and the process is as following:

Step G, after the user switching and releasing processed by the Master MP, the Master MP checking the assignment condition of the carrier frequency of the group users on the local MP, if the number of users at one carrier frequency F1 exceeds the number of users at the carrier frequency reference by a certain threshold, proceeding to step H, otherwise, no further process being performed and ending;

Step H, the Master MP checking each Slave MP to acquire the using condition of the carrier frequency by all group users managed by the BSS, if the number of users at the carrier frequency F1 exceeds the number of users at the carrier frequency reference by a certain threshold, proceeding to step I, otherwise, no further process being performed and ending;

Step I, the Master MP updating the carrier frequency reference and sending the carrier frequency reference update message which carries the information of the carrier frequency F1 to all the Slave MPs, the Slave MP updating the information of the carrier frequency reference on the local MP after receiving the update message.

In the above two processes, after the base carrier frequencies of the group have been updated, the group users, especially the users who access subsequently, can be guaranteed to be assigned to the carrier frequency reference so as to realize the sharing of wireless channel to the largest extent.

In the above two processes, the threshold can be set as that the number of users at one carrier frequency exceeds the number of users at the carrier frequency reference by 20%, or the number of users at one carrier frequency is 20 more than the number of users at the carrier frequency reference.

In another embodiment of the present invention, the Slave MP can originate the checking in the Master MP and other Slave MPs to determine whether the number of group users managed by the local BSS at the carrier frequency F1 exceeds the number of users at the carrier frequency reference by a certain threshold, if yes, notify the Master MP. But there still exists the problem that the control points are dispersive and the interaction between the MPs is relatively complicated.

The Second Embodiment

This embodiment applies centralized process. In this mode, the assignment and the maintenance of all the base carrier frequencies are performed at one control point (namely one designated MP). After the group call access request (request of originating a call or response to the paging) is received, the carrier frequency reference is determined by the control point according to the predetermined strategy, and the control point directly deletes the saved carrier frequency reference after the group call is ended. Since the control point is unique, there is no need for synchronization process. Once the carrier frequency reference is determined, the calls of all group members are assigned at the carrier frequency reference as far as possible. In addition, after the carrier frequency reference is determined, the carrier frequency reference of the group call can also be updated to the carrier frequency F1 when the number of users at the carrier frequency F1 exceeds the number of users at the carrier frequency reference.

In the centralized process, the control point of the carrier frequency reference is unique, so it is easily maintained. Yet the shortcomings are also evident, firstly, the risk is high; secondly, the system capacity is limited. Compared with the centralized process, the distributed process is more complicated to be operated, but it has the advantage that the system capacity can be expanded, and the operation of the whole system will not be affected if any processing point has a problem.

The description of the preferred embodiments of the present invention is offered to enable those skilled in the art to use the method of the present invention. All kinds of modifications about these embodiments are evident for those skilled in the art, and the basic principle defined here can be applied in other embodiments without utilizing any creativity. Therefore, the scope of the present invention is not limited to the embodiments shown here but should accord with the widest range consistent with the disclosed principles and novelty characteristics. The above method can also be used for private group call.

INDUSTRIAL APPLICABILITY

The present invention provides a method for assigning carrier frequency in a trunking system, so as to establish all group members under a BSS at one carrier frequency reference as far as possible.

What we claim is:

1. A method for assigning carrier frequency, comprising:
after a base station subsystem has received a group call request, assigning, in a trunking system, one reference carrier frequency to the group call and establishing forward channels of all group members, of which each corresponds to one forward channel, managed by the base station subsystem at the reference carrier frequency, so that the forward channels of all group members can be considered as being combined into one forward channel to realize a wireless channel sharing mechanism;
wherein the group call is processed by a plurality of main processors (MPs), the base station subsystem assigns a master main processor (Master MP) to the group, and other MPs work as slave main processors (Slave MPs); and wherein when the base station subsystem receives the group call request, the following steps are performed:
(a) the base substation system selecting a MP and sending the group call request to the selected MP, performing step (b) if the selected MP is a Master MP; performing step (c) if the selected MP is a Slave MP;
(b) after the Master MP having received the group call request, determining whether the reference carrier frequency of the group call exists, if yes, the step (b) ends; otherwise, assigning the reference carrier frequency to the group call and announcing it to all the Slave MPs, the Slave MPs determining or updating a local reference carrier frequency after receiving the reference carrier frequency;
(c) after the Slave MP having received the group call request, determining whether the reference carrier frequency of the group call exists, if yes, the step (c) ends; otherwise, notifying the Master MP, then the Master MP determining the reference carrier frequency of the group call and announcing it to all the Slave MPs through a message, the Slave MPs determining or updating the local reference carrier frequency according to the reference carrier frequency in the message after having received the message.

2. The method of claim 1, wherein the group call request is a group access request by a user, including an originating request from the user or a response sent by the user after the user has received a paging request from a dispatch server.

3. The method of claim 1, wherein the reference carrier frequency assigned to the group call is statically configured in a dispatch server system as an attribute of the group.

4. The method of claim 1, wherein the group call is centrally processed by a processing board main processor (MP), the reference carrier frequency of the group is dynamically assigned by the MP according to predetermined rules and deleted after the call is completed.

5. The method of claim 4, wherein after the MP has assigned the reference carrier frequency, if group members at a carrier frequency F1 are more than the users at an original reference carrier frequency by a predetermined threshold, the MP updates the reference carrier frequency of the group call to the carrier frequency F1.

6. The method of claim 1, wherein after the Slave MP has received the group call request in said step (c), it firstly assigns a temporary reference carrier frequency for the call, and sends a reference carrier frequency registration request which carries the temporary reference carrier frequency to the Master MP; after the Master MP has received the registration request, it checks whether the reference carrier frequency of the group call exists, if yes, it announces the reference carrier frequency to all the MPs, otherwise, the temporary reference carrier frequency is used as the reference carrier frequency of the group call, a registration response is returned to the Slave MP and a reference carrier frequency synchronization message is sent to other Slave MPs.

7. The method of claim 6, wherein the Master MP and the Slave MP assign the reference carrier frequency or the temporary reference carrier frequency according to a condition that the load is lightest or the resource is most sufficient, or according to a condition that the load is smaller than a predetermined threshold.

8. The method of claim 1, further comprising the following steps of deleting the reference carrier frequency:
(i) after the Slave MP having received a release message from the user, determining that the user is the last user in the group call processed by the MP, sending a reference carrier frequency deleting request to the Master MP;
(j) after the Master MP having received the deleting request, checking locally whether there are still users in the call, if no, checking other Slave MPs and determining whether the user is the last user in the call managed by the base station subsystem; if yes, performing step (k), otherwise, the steps of deleting the reference carrier frequency ends;
(k) the Master MP deleting the reference carrier frequency of the group call and sending a reference carrier frequency deleting message to all the Slave MPs, the Slave MPs deleting the reference carrier frequency of the group call after having received the message.

9. The method of claim 1, further comprising the following steps of deleting the reference carrier frequency, wherein:
(o) after the Master MP having received a release message from the user, it locally checking whether the user is the last user in the call managed locally, if yes, performing the next step, otherwise, the steps of deleting the reference carrier frequency ends;
(p) the Master MP checking each of the Slave MPs of the group to determine whether the user is the last user in the call managed by the Base Station Subsystem, if yes, performing step (q), otherwise, the steps of deleting the reference carrier frequency ends;
(q) the Master MP deleting the reference carrier frequency of the group call and sending the reference carrier frequency deleting message to all the Slave MPs, the Slave MPs deleting the reference carrier frequency of the group call after having received the reference carrier frequency deleting message.

10. The method of claim 1, wherein whenever there is user handoffing or releasing, the Master MP obtains a using condition of the carrier frequency from all users in the group call, if the number of the users at a carrier frequency F1 exceeds the number of users at the reference carrier frequency by a predetermined threshold, the reference carrier frequency on all the MPs is updated to the carrier frequency F1.

11. The method of claim 10, wherein a process of updating the reference carrier frequency includes the following steps of:
after user handoffing and releasing being processed by the Slave MP, the Slave MP checking a number of the group users on the carrier frequency F1 locally, if the number of users at the carrier frequency F1 exceeds the number of users at the original reference carrier frequency by the predetermined threshold, performing the next step, otherwise, the process of updating the reference carrier frequency ends;
the Slave MP sending a reference carrier frequency update request with information of the carrier frequency F1 to the Master MP; after the Master MP having received the message, it checking at the local and in other Slave MPs to obtain the using condition of the carrier frequencies by all the group users managed by the base station subsystem, if the number of users at the carrier frequency F1 exceeds the number of users at the reference carrier frequency by the predetermined threshold, performing the next step, otherwise, the process of updating the reference carrier frequency ends;
the Master MP updating its reference carrier frequency and sending a reference carrier frequency update message with the information of the carrier frequency F1 to all the Slave MPs, the Slave MPs updating the reference carrier frequency locally after receiving the update message.

12. The method of claim 10, further comprising steps of updating the reference carrier frequency, wherein:
(I) after user switching and releasing being processed by the Master MP, the Master MP checking the assignment condition of the carrier frequency of the group users on the current MP, performing the next step if the number of users at one carrier frequency F1 exceeds the number of users at the reference carrier frequency by the predetermined threshold, otherwise, the steps of updating the reference carrier frequency ends;
(J) the Master MP checking each Slave MP to acquire the using condition of the carrier frequency by all the group users managed by the base station system, performing the next step if the number of users at the carrier frequency F1 exceeds the number of users at the reference carrier frequency by the predetermined threshold, otherwise, the steps of updating the reference carrier frequency end;
(K) the Master MP updating its reference carrier frequency and sending the reference carrier frequency update message with the information of the carrier frequency F1 to all the Slave MPs, the Slave MPs updating the information of the basic carrier frequency on the local MP after receiving the update message.

13. The method of claim 8, further comprising steps of deleting the reference carrier frequency, wherein:

(o) after the Master MP having received the release message from the user, it locally checking whether the user is the last user in the call managed locally, if yes, performing the next step, otherwise, the steps of deleting the reference carrier frequency ends;

(p) the Master MP checking each of the Slave MPs of the group to determine whether the user is the last user in the call managed by the base station subsystem, if yes, performing the next step, otherwise, the steps of deleting the reference carrier frequency ends;

(q) the Master MP deleting the reference carrier frequency of the group call and sending the reference carrier frequency deleting message to all the Slave MPs, the Slave MPs deleting the reference carrier frequency of the group call after having received the message.

14. The method of claim 11, wherein the process of updating the reference carrier frequency further includes the following additional steps:

(I) after user switching and releasing being processed by the Master MP, the Master MP checking the assignment condition of the carrier frequency of the group users on the current MP, performing the next step if the number of users at one carrier frequency F1 exceeds the number of users at the reference carrier frequency by the predetermined threshold, otherwise, the additional steps end;

(J) the Master MP checking each Slave MP to acquire the using condition of the carrier frequency by all the group users managed by the Base Station System, performing the next step if the number of users at the carrier frequency F1 exceeds the number of users at the reference carrier frequency by the predetermined threshold, otherwise, the additional steps end;

(K) the Master MP updating its reference carrier frequency and sending the reference carrier frequency update message with the information of the carrier frequency F1 to all the Slave MPs, the Slave MPs updating the information of the basic carrier frequency on the local MP after receiving the update message.

\* \* \* \* \*